United States Patent [19]
Perrier et al.

[11] Patent Number: 6,023,543
[45] Date of Patent: Feb. 8, 2000

[54] BIDIRECTIONAL OPTICAL LINK, AND DEVICE FOR AMPLIFYING SUCH LINK

[75] Inventors: Philippe Perrier, Velizy-Villacoublay, France; Jean-Marc Delavaux, Wescosville, Pa.

[73] Assignee: Alcatel Cit, Paris, France

[21] Appl. No.: 09/117,735

[22] PCT Filed: Feb. 3, 1997

[86] PCT No.: PCT/FR97/00204

§ 371 Date: Nov. 16, 1998

§ 102(e) Date: Nov. 16, 1998

[87] PCT Pub. No.: WO97/29562

PCT Pub. Date: Aug. 14, 1997

[30]  Foreign Application Priority Data

Feb. 6, 1996 [FR] France ................................. 96 01406

[51] Int. Cl.$^7$ ...................................................... G02B 6/28
[52] U.S. Cl. ................................ 385/24; 385/20; 385/21; 385/27; 385/31; 359/109; 359/154; 359/333
[58] Field of Search .................................. 385/15–24, 27, 385/31; 359/109, 154, 159, 160

[56]  References Cited

U.S. PATENT DOCUMENTS 5,898,801   4/1999   Braun et al. ............................... 385/24

FOREIGN PATENT DOCUMENTS 0 535 590 A2   4/1993   European Pat. Off. .
0 585 005 A1   3/1994   European Pat. Off. .
WO 95/15625   6/1995   WIPO .

OTHER PUBLICATIONS

Cheng et al, "622 Mb/S, 144 km transmission using a bidirectional fiber amplifier repeater", IEEE Photonics Technology Letters, vol. 5, No. 3, Mar. 1993, New York, US, pp. 356–358.

Kannan et al, "Unrepeatered bidirectional transmission system over a single fiber using optical fiber amplifiers", IEEE Photonics Technology Letters, vol. 5, No. 1, Jan. 1993, New York US, pp. 76–79.

*Primary Examiner*—Phan T. H. Palmer
*Attorney, Agent, or Firm*—Sughrue, Mion, Zinn, Macpeak & Seas, PLLC

[57]  ABSTRACT

An end station of a both-way optical link comprises: a receiver (RX) preceded by a receive optical amplifier (RA); a transmitter (TX) followed by a transmit optical amplifier (TA); a pump laser diode (PX) for delivering the pumping waves required by said amplifiers; and a coupler (B) of the passive type having two groups of two branches. The two branches of one group (BL and BP) are connected respectively to a line fiber (L) for both-way light guidance and to the pump (PX), the two branches of the other group (BR and BT) being connected respectively to the receive optical amplifier (RA) and to the transmit optical amplifier (TA). An in-line optical amplifier apparatus can be constituted in similar manner. The invention is applicable to telecommunications.

10 Claims, 2 Drawing Sheets

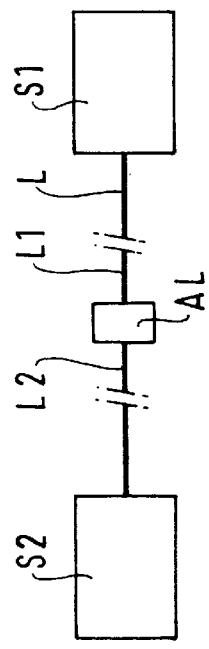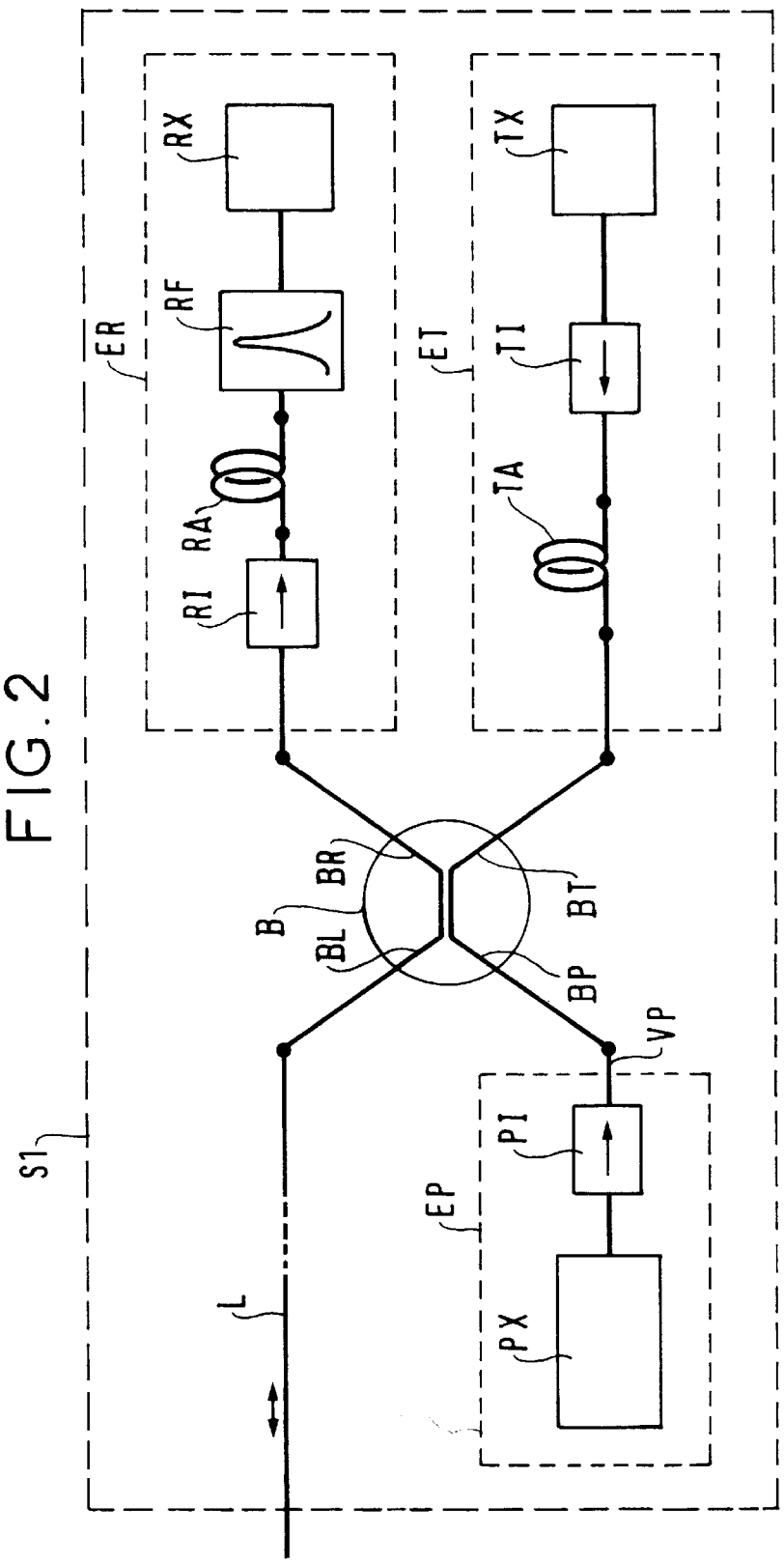

BIDIRECTIONAL OPTICAL LINK, AND DEVICE FOR AMPLIFYING SUCH LINK

TECHNICAL FIELD

The present invention relates to optical telecommunications. More specifically, it relates to interconnecting two stations of a telecommunications system when the connection is to be a both-way connection. Each station then has a receiver terminal and a transmitter terminal which need to be connected respectively to the transmitter terminal and to the receiver terminal of the other station by a line interconnecting the two stations.

BACKGROUND OF THE INVENTION

In a known link providing such interconnection, the line interconnecting the two stations is a pair of lines, i.e. it has two individual lines set up in parallel between the two stations. Each individual line is constituted by optical fiber sections connected together in series. In order to compensate for line losses, each terminal includes amplifier apparatus which, for each line, has an optical amplifier which is typically constituted by an optically-pumped erbium-doped silica fiber. In general, the word "amplifier" is used below to designate a light guide that is suitable for amplifying a light wave when said light wave to be amplified travels thereal ong simultaneously with a pumping wave.

For the same purpose of compensating losses, in-line amplification apparatuses can also be distributed along the length of the link. Each of them then also includes one such amplifier for each line.

It is known to use in such amplifier apparatus a common pump or a plurality of common pumps for supplying the two pumping waves necessary for the two amplifiers. Passive optical couplers of the type having two groups of two branches can then direct a fraction of the power of said pump or said pumps to each of the amplifiers without interfering with their respective connections to the two individual lines of the link.

Furthermore, such a link must be robust, i.e. it must in particular be made in such a manner that the operation of the transmitters and of the receivers is disturbed as little as possible and as rarely as possible by light waves not intended for them.

Such robustness would appear to be obtained to a reasonable degree in the above-mentioned known link.

Another essential characteristic of such a link is the quantity of information it is capable of conveying per second. A link may have a plurality of information channels implemented by spectrum, time, or other multiplexing on one or more lines, and this quantity needs to be distinguished from the data rate of each channel. On this topic, it has been found that in some known links of the kind described above and that are already in operation, that the maximum quantity of information that was specified at the time they were established and which they are capable of conveying now appears to be insufficient.

This quantity could be increased either by increasing the data rate of the terminals of each line, or by increasing the number of terminals included in the stations and similarly increasing the number of lines interconnecting the stations, and in both cases that would be expensive. If increasing the number of terminals, a major portion of the cost of obtaining such an increase in the quantity of information would lie in setting up new lines.

SUMMARY OF THE INVENTION

A particular object of the present invention is to enable the quantity of information that can be conveyed by an optical link having two lines that are already installed to be increased at moderate cost without providing a corresponding increase in the number of optical lines and without decreasing the robustness of the link.

Another object of the invention is to enable a both-way optical link to be implemented at low cost that is robust and capable of conveying information at a high data rate.

Specifically, the invention provides amplification apparatus for a both-way optical link, said link conveying first and second carrier waves carrying information and propagating in light guides respectively in first and second mutually opposite directions. In known manner the apparatus comprises:

a first optical amplifier and a second optical amplifier constituted by light guides respectively conveying the first and second carrier waves, said light guides being doped to be capable of amplifying said waves when the guides are excited by pumping waves;

at least one pump for providing a pump path with pumping light suitable for constituting said pumping waves; and pump coupling means connecting said pump path to said two amplifiers to supply them respectively with said two pumping waves taken from said pumping light.

According to the invention, said pump coupling means comprise an optical component referred to below as a "distributor" and having two groups of two branches, the two branches of one group being connected respectively to a line fiber guiding the two carrier waves and to the pump path, the two branches of the other group being connected respectively to the two amplifiers.

Such a distributor can be constituted by a two-by-two passive optical coupler of known type. Such a coupler shares the pumping light between two pumping waves having the same power or different powers, which waves are respectively supplied to the two amplifiers.

The distributor could also be constituted by some other type of optical component, that is sensitive to wavelength, imparting smaller insertion loss to the power of each of the two information carrier waves. With pumping light constituted by two pumping waves of different wavelengths, such a component would direct the two pumping waves respectively to the two amplifiers.

BRIEF DESCRIPTION OF THE DRAWINGS

There follows a more detailed description by way of non-limiting example explaining how the present invention can be implemented, and given with reference to the accompanying diagrammatic figures. When the same element is shown in more than one of the figures, it is given the same reference symbol.

FIG. 1 is an overall view of an optical link of the present invention.

FIG. 2 is a view of an end station for the FIG. 1 link.

BEST MODE FOR CARRYING OUT THE INVENTION

Figure 3:
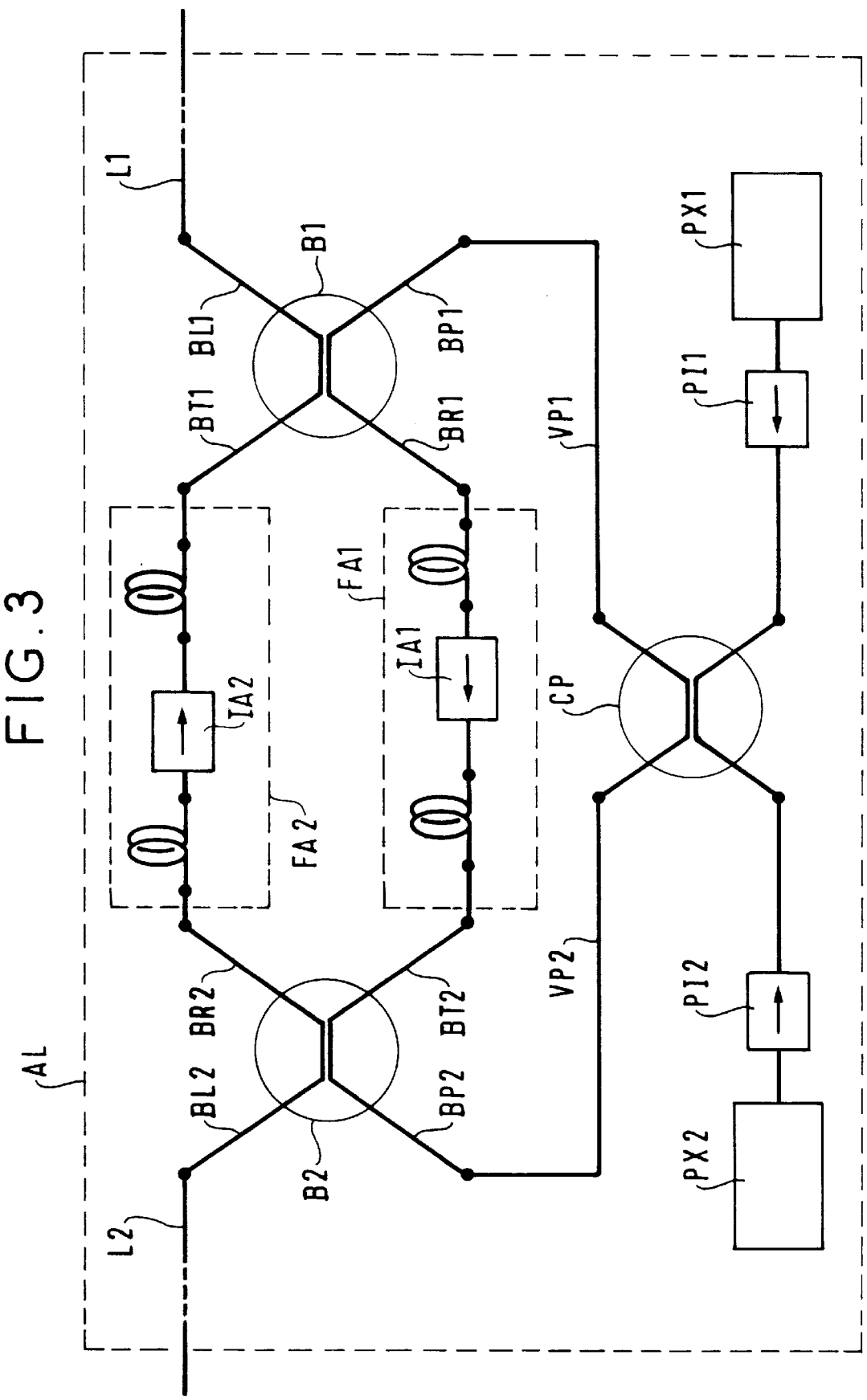
FIG. 3 is a view of in-line amplification apparatus included in the FIG. 1 link.

In conventional manner, and as shown in FIG. 1, a both-way optical link comprises first and second stations S1 and S2 situated apart from each other. A line L interconnects the two stations. It is constituted by an optical fiber which is typically silica-based. Each of the two stations has optical elements each corresponding to an element of the same name and performing the same function and belonging to the other station. As shown in FIG. 2, these elements are as follows for the first station:

A receive optical amplifier such as a doped optical fiber preamplifier RA receiving an optical receive signal conveyed to said station over the line L. This amplifier is optically pumped by a receive pumping wave so as to amplify said receive signal.

A receiver RX including a photodetector such as a semiconductor diode for receiving the amplified receive signal and for responding by supplying the receive information that was being carried by the signal. The receive amplifier and the receiver are included in a receive terminal ER.

A transmitter TX comprising a light source such as a semiconductor laser receiving transmit information to be transmitted and responding by supplying an optical transmit signal carrying said information.

A transmit optical amplifier such as a doped optical fiber doped amplifier TA receiving said transmit signal. This amplifier is optically pumped by a transmit pumping wave to supply an amplified transmit signal. The transmitter and the transmit amplifier are included in a transmit terminal ET.

A pump assembly EP providing the receive and transmit pumping waves.

Coupling means receiving the receive and transmit pumping waves and conveying said waves to the receive and transmit optical amplifiers, respectively.

Coupling means receiving the receive signal from the line L and conveying said signal to the receive amplifier RA.

Coupling means receiving the transmit signal from the transmit assembly ET and conveying said signal to the line L.

According to the present invention, the line L is a single line which guides the amplified transmit signal and the receive signal of the first station in a single optical fiber, at least in the vicinity of said first station. This fiber constitutes a line fiber. In a typical implementation of the invention, the line L is a single line over its entire length.

The coupling means of the first station then comprise a distributor B constituted by a two-by-two passive coupler having two groups of branches each having two branches. Any signal received on either of the two branches in either of the two groups is conveyed by the coupler, e.g. at 50% of the power of said signal, to each of the two branches of the other of the two groups.

A first group of branches has a line branch BL connected to the line fiber L and a pump branch BP connected to the pump assembly EP. The second group of branches has a receive branch BR connected to the receive optical amplifier RA and a transmit branch BT connected to the transmit optical amplifier TA.

The receive and transmit optical amplifiers RA and TA, the pump assembly EP, and the coupler B together constitute station amplification apparatus.

The receiver RX is sensitive to waves at a wavelength which constitutes both the receive wavelength XR of the first station and the transmit wavelength of the second station. The transmitter TX transmits at a wavelength which constitutes both the transmit wavelength XT of the first station and the receive wavelength of the second station and which is different from the receive wavelength of said first station. By way of example, these wavelengths are $\lambda R=1550$ nm and $\lambda T=1554$ nm. The pumping waves have a pump wavelength $\lambda P=1480$ nm or 980 nm. Nevertheless, it should be understood that the receive and transmit wavelengths can be different from those mentioned above and can then either be very close to each other, e.g. 1545 nm and 1546 nm, or else further apart, e.g. one in the range 1520 nm to 1540 nm and the other in the range 1540 nm to 1560 nm, or very far apart, e.g. in the vicinity of 1300 nm and in the vicinity of 1500 nm.

The pump amplifiers and the pumping wavelengths are naturally matched to the transmit and receive wavelengths.

The receive terminal ER preferably includes optical filter means such as a filter RF or a spectral demultiplexer connected between the receive optical amplifier RA and the receiver RX to prevent the receive pumping wave reaching the receiver and reducing the quantity of light amplified by said amplifier, in particular reducing the amplified spontaneous emission seen by the receiver RX while nevertheless conveying the amplified receive signal to said receiver. It also includes an optical isolator RI connected between the pump sharing coupler B and the receive optical amplifier RA to prevent light amplified by said amplifier, in particular amplified spontaneous emission, from going towards the coupler.

The transmit terminal ET further includes transmit isolation means such as an optical isolator TI or a filter connected between the transmitter TX and the transmit amplifier TA to prevent the transmit pump wave and light amplified by said amplifier, in particular amplified spontaneous emission, from reaching the transmitter.

The pump assembly EP has at least one pump PX such as a laser diode and pump isolation means such as optical isolator PI or a filter connected between the pump sharing coupler B and the pump PX to prevent the amplified transmit signal and the amplified spontaneous emission signal from reaching the pump.

In FIGS. 2 and 3, welds making connections between successive fibers are shown as spots of greater thickness on the line representing the fiber. These connections can nevertheless be implemented by any known means.

The above-described both-way optical link has robustness comparable to that of a conventional link, particularly robustness against the three risks specified below, on the assumption that the only amplification apparatus included in the link is the station amplification apparatus of the kind described above.

A first risk is associated with the following facts:

The amplified transmit signal has high power in the vicinity of the station transmitting it (e.g. the first station). Rayleigh backscattering in the line fiber L is thus high. The light backscattered in this way is directed in part by the coupler B to the receiver assembly ER and could therefore prevent it from detecting the receive signal properly. However, in the context of the present invention, it has been found easy to give the receive wavelength XR and the transmit wavelength XT values that are far enough apart to avoid that drawback, e.g. by using the filter RF, and without requiring the wavelengths to go outside the spectral range that is conveyed properly by a line L of ordinary type, and without going beyond the spectral range that is amplified properly by optical amplifiers of ordinary type. Such values are given above.

A second risk is associated with the following facts: a portion of the output power from the transmit amplifier TA is returned to said amplifier by Rayleigh backscattering in the line fiber L, and can therefore be reamplified together with the signal supplied by the transmitter TX, thereby degrading the signal delivered by the amplifier.

Nevertheless, it has been found in the context of the present invention that the gain saturation normally provided in such a power amplifier is such that this degradation is negligible.

A third risk is associated with the following facts:

A fraction of the power of the receive signal is directed by the coupler B to the transmit optical amplifier TA. It is thus amplified by the amplifier and runs the risk of contributing in variable manner to the gain saturation of the amplifier. That would cause the transmit signal to be subjected to varying amounts of amplification in the amplifier, i.e. the amplified transmit signal would carry parasitic modulation. However, in the context of the present invention, it has been found that the power of the receive signal received by the transmit optical amplifier in a typical case is of a level that is sufficiently low, and in all cases much lower than that of the transmit signal transmitted by TX, so that this potential drawback is negligible. The level of the parasitic modulation in question is typically in the vicinity of 0.5 dB when the received power is −30 dBm.

A fourth risk is associated with the following facts:

The line fiber between the pump sharing coupler and the transmit optical amplifier of the second fiber might break, thereby causing light to be reflected. The transmit optical amplifier TA of the first station would then receive its own signal reflected on the break, and delayed by its go-and-return propagation time along the line L.

This delayed signal could disturb the operation of the amplifier.

In the context of the present invention, is has nevertheless been found that in a typical link as described above and in similar links, the level of the reflected and delayed link received by the optical amplifier TA is low enough to have no troublesome effect.

More generally, it has been found that the present invention makes it possible to double the quantity of information conveyed by a line without giving rise in practice to the additional risks that might have been expected.

Insofar as the length of a link of the kind in question warrants it, such a link can also advantageously include in-line amplification apparatus at one or more locations distributed along the length of the line. An example of such in-line amplification apparatus AL is described below. It is inserted between first and second successive segments L1 and L2 of the line fiber L situated respectively on the same side as the first station S1 and as the second station S2. It comprises the following elements:

first and second optical amplifiers FA1 and FA2 suitable for receiving first and second pumping waves and then for receiving and amplifying waves having said first and second wavelengths, respectively;

at least one pump PX1 for providing on first and second pump paths VP1 and VP2 pumping light that is suitable for constituting said pumping waves; and first and second distributors constituted by couplers B1 and B2 of said two-by-two passive type. The line branches BL1 and BL2 of those two couplers are connected to the first and second line segments L1 and L2, their pump branches BP1 and BP2 are connected to the first and second pump paths VP1 and VP2, their receive branches BR1 and BR2 are connected to the first and second amplifiers FA1 and FA2, and their transmit branches BT1 and BT2 are connected to the second and first amplifiers FA2 and FA1, respectively. Each amplifier such as FA1 preferably includes two amplifying fibers such as FD1 and FD2 on either side of the isolator such as IA1, thereby making it possible simultaneously to provide pumping that is more effective because amplification of spontaneous emission in the opposite direction.

Preferably, first and second amplification optical isolators IA1 and IA2 are included in the first and second amplifiers FA1 and FA2 for selectively conveying the light waves propagating from the first and second couplers, respectively.

Also preferably, the in-line amplification apparatus AL has first and second pumps PX1 and PX2 provided with first and second pump-protecting optical isolators PI1 and PI2, respectively. Each of these two pumps feeds the two pump paths VP1 and VP2 via a common pump mixing coupler CP so as to make the apparatus robust in the event of one of the two pumps failing.

The length of line L that exists between two successive amplifier apparatuses is typically of the order of 40 km or more, with said apparatuses being located either in a station or in line.

Although the above description refers to a single information carrier wave being conveyed in each direction, it must be understood that the present invention is equally applicable with a plurality of such waves, e.g. of different wavelengths, being conveyed in each direction.

We claim:

1. Amplifier apparatus for a both-way optical link, said link conveying at least one first and at least one second carrier wave carrying information and propagating in respective mutually opposite first and second directions in a light guide, the apparatus comprising:

first and second optical amplifiers (RA, TA) each constituted by a light guide respectively conveying the first and second carrier waves, said light guides being doped to be capable of amplifying said waves when excited by pumping waves;

at least one pump (PX) for providing, on a pump path (VP), pumping light suitable for constituting said pumping waves; and pump coupling means connecting said pump path to both of said optical amplifiers to provide them respectively with said two pumping waves from said pumping light;

the apparatus being characterized by the fact that said pump coupling means include a distributor (B) possessing four branches, constituting:

a line branch (BL) connected to a line fiber (L) guiding said two carrier waves;

a pump branch (BP) connected to said pump path (VP); and first and second amplification branches (BR and BT) respectively connected to said first and second optical amplifiers (RA and TA);

said amplifier being suitable:

for conveying part of said pumping light from said pump branch to each of its said first and second amplification branches;

for conveying at least a part of said first carrier wave from its said line branch to its said first amplification branch; and for conveying at least a portion of said second carrier wave from its said second amplification branch to its said line branch.

2. Apparatus according to claim 1, said distributor being constituted by a two-by-two passive optical coupler.

3. A both-way optical link comprising first and second stations (S1 and S2) situated apart from each other and connected to each other by an optical fiber line (L), each of said two stations comprising transmit and receive optical elements which are as follows, at least in said first station (S1):

a receive optical amplifier (RA) receiving an optical receive signal carrying receive information and conveyed to said station over the line (L), said amplifier being optically pumped by a receive pumping wave so as to amplify said receive signal;

a receiver (RX) for receiving said amplified receive signal and for responding by supplying the received information that is carried by said signal, the receive optical amplifier and the receiver being included in a receive terminal (ER);

a transmitter (TX) receiving transmit information to be transmitted and responding by delivering an optical transmit signal carrying said information; and a transmit optical amplifier (TA) receiving said transmit signal, said amplifier being optically pumped by a transmit pump wave to supply an amplified transmit signal, the transmitter and the transmit amplifier being included in a transmit terminal (ET);

said link including, for said station:

a pump assembly (EP) providing pumping light suitable for constituting said receive and transmit pumping waves; and a coupling assembly, said coupling assembly constituting:

coupling means receiving the pumping light and directing said light to the receive and transmit optical amplifiers, the receive and transmit optical amplifier (RA, TA) and the pumping assembly (EP) together with said coupling means constituting station amplification apparatus;

coupling means receiving the receive signal from the line (L) and conveying said signal to the receive amplifier; and coupling means receiving the transmit signal from the transmit assembly and conveying said signal to the line (L);

said link being characterized by the fact that the line (L) guides the amplified transmit signal and the receive signal from the first station in the same optical fiber, said fiber constituting a line fiber (L);

said coupling assembly for said first station comprising a distributor (B) having two groups of two branches, the two branches of one group (BL and BP) being connected respectively to a line fiber (L) guiding both carrier waves and to the pump path (VP), the two branches of the other group (BR and BT) being connected respectively to said two optical amplifiers (RA and TA) to couple the line fiber and the pump path to said two amplifier, said receiver of the first station being sensitive to waves having a first wavelength constituting both the receive wavelength ($\lambda R$) of the first station and a transmit wavelength of the second station, the transmitter (TX) of the first station transmitting at a second wavelength ($\lambda T$) which constitutes both the transmit wavelength of the first station and the receive wavelength of the second station, and which is different from the first wavelength.

4. A link according to claim 3, said distributor (B) being constituted by a two-by-two passive optical coupler having two groups of branches each comprising two branches, and such that any signal received on either of said two branches of either of said two groups is conveyed in part by said coupler to each of the two branches of the other of the two groups, one group of branches comprising a line branch (BL) connected to the line fiber (L) and a pump branch (BP) connected to the pump assembly (EP), the other group of branches comprising a receive branch (BR) connected to the receive optical amplifier (RA) and a transmit branch (BT) connected to the transmit optical amplifier (TA).

5. A link according to claim 3, characterized by the fact that the receive terminal (ER) includes filter means (RF) connected between the receive optical amplifier (RA) and the receiver (RX), and selectively conveying the amplified receive signal to said receiver.

6. A link according to claim 3, characterized by the fact that the receive terminal (ER) further includes an optical isolator (RI) connected between the pump sharing elements (B) and the receive optical amplifier (RA) to prevent light amplified by said amplifier from going to said coupler.

7. A link according to claim 3, characterized by the fact that the transmit terminal (ET) further includes transmit isolation means (TI) connected between the transmitter (TX) and the transmit optical amplifier (TA) to prevent light waves from reaching the transmitter.

8. A link according to claim 3, characterized by the fact that the pump assembly (EP) includes at least one pump (PX) and pump isolation means (PI) connected between the pump sharing element (B) and each pump (PX) to prevent the amplified transmit signal reaching the pump.

9. A both-way optical link including first and second stations (S1, S2) connected to each other by a line fiber (L) to convey first and second carrier waves carrying information and propagating in said line fiber respectively in a first direction and in a second direction opposite to said first direction, said link further including at least one in-line amplifier apparatus (AL) inserted between first and second successive segments (L1 and L2) belonging to said line fiber (L) and situated respectively on the first station side and on the second station side thereof, said apparatus comprising:

first and second optical amplifiers (FA1 and FA2) suitable for receiving first and second pumping waves and then for receiving and amplifying at least said first and second carrier waves, respectively; and a pumping assembly (PX1) for providing, on first and second pump paths (VP1 and VP2), pumping light suitable for constituting said pumping waves;

said link being characterized by the fact that said amplification apparatus comprises first and second distributors (B1, B2) having two groups of two branches with the branches of each of said groups of branches of each distributor being coupled to the branches of the other group of branches of said distributor, one group of branches of each distributor being constituted by a line branch and a pump branch, the other group of branches of each distributor being constituted by a receive branch and a transmit branch, said line branches (BL1 and BL2) of said two distributors being connected to said first and second line segments (L1 and L2), said pump branches (BP1 and BP2) of said two distributors being connected to said first and second pump paths (VP1 and VP2), said receive branches (BR1 and BR2) of said two distributors being connected to said first and second optical amplifiers (FA1 and FA2), and said transmit branches (BT1 and BT2) of said two distributors being connected to said first and second optical amplifiers (FA2 and FA1), respectively.

10. A link according to claim 9, characterized by the fact that pump assembly comprises first and second pumps (PX1 and PX2) respectively provided with first and second pump-protecting optical isolators (PI1 and PI2), and each feeding both of said pump paths (VP1 and VP2) via a common pump mixing coupler (CP) so as to make the apparatus robust against failure of one of the two pumps.

* * * * *